United States Patent
Jiang (10) Patent No.: US 11,910,505 B2
(45) Date of Patent: Feb. 20, 2024

(54) DEVICE FOR REDUCING JITTER OF LIGHT SOURCE IN LOW BRIGHTNESS BY VIBRATION SUPPRESSION MODULE AND LIGHT FIXTURE

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 17/588,899

(22) Filed: Jan. 31, 2022

(65) Prior Publication Data
US 2023/0180367 A1 Jun. 8, 2023

(30) Foreign Application Priority Data
Nov. 1, 2021 (CN) .......................... 202111284292.2

(51) Int. Cl.
*H05B 45/59* (2022.01)
*H05B 45/14* (2020.01)

(52) U.S. Cl.
CPC ............ *H05B 45/59* (2022.01); *H05B 45/14* (2020.01)

(58) Field of Classification Search
None
See application file for complete search history.

(56) References Cited

U.S. PATENT DOCUMENTS

| | | | | |
|---|---|---|---|---|
| 9,198,247 B2 * | 11/2015 | Ito | ........................ | H05B 45/48 |
| 2008/0290819 A1 * | 11/2008 | Hoepfner | .............. | H05B 31/50 |
| | | | | 315/306 |
| 2009/0122580 A1 * | 5/2009 | Stamm | ............... | H05B 45/3725 |
| | | | | 363/44 |
| 2012/0206064 A1 * | 8/2012 | Archenhold | ....... | H05B 45/3725 |
| | | | | 315/297 |
| 2013/0221864 A1 * | 8/2013 | Fukasawa | ............... | H02M 1/32 |
| | | | | 315/200 R |
| 2014/0021879 A1 * | 1/2014 | Yu | ......................... | H05B 45/38 |
| | | | | 315/206 |
| 2014/0111113 A1 * | 4/2014 | Del Carmen, Jr. | .. | H05B 45/375 |
| | | | | 363/78 |
| 2015/0327340 A1 * | 11/2015 | Siessegger | ........... | H05B 45/375 |
| | | | | 315/200 R |
| 2018/0159420 A1 * | 6/2018 | Horsky | ................. | H02M 3/156 |
| 2019/0037659 A1 * | 1/2019 | Chen | .................... | H05B 45/375 |

FOREIGN PATENT DOCUMENTS

JP 5514337 B2 * 6/2014 ............... G05F 3/08

* cited by examiner

*Primary Examiner* — Anh Q Tran (74) *Attorney, Agent, or Firm* — Muncy, Geissler, Olds & Lowe, P.C.

(57) ABSTRACT

A device for reducing jitter of light source in low brightness by a vibration suppression module includes an LED light source, an inductor L, a current control module, a switch K1, a signal control module, a current acquisition module, and the vibration suppression module. The present invention can eliminate a current ripple in a rising process of a current in the LED light source, as well as suppressing current oscillations generated when the current changes suddenly, the current on the LED light source thus can rise steadily, the LED light source can be steadily brightened in a brightness adjusting process of a dark part, and a phenomenon of light flicker and jitter caused by the current oscillation and the current ripple is avoided.

11 Claims, 7 Drawing Sheets

DEVICE FOR REDUCING JITTER OF LIGHT SOURCE IN LOW BRIGHTNESS BY VIBRATION SUPPRESSION MODULE AND LIGHT FIXTURE

CROSS REFERENCE TO RELATED APPLICATIONS

The present application claims priority from Chinese Patent Application No. 202111284292.2 filed on Nov. 2, 2021, all of which are hereby incorporated herein by reference.

TECHNICAL FIELD

The present invention relates to the field of semiconductor lighting equipment, and, more particularly, relates to a device for reducing jitter of a light source in low brightness by a vibration suppression module and a light fixture with the same.

BACKGROUND

The human eye is sensitive to changes in light in a dark environment, for example, in pitch darkness, faint changes in the fluorescence of fireflies can be seen. However, the human eye is numb to changes in light in a strong light environment, for example, under the scorching sun, lumens difference cannot be sensed when one candle or two candles is light on.

In the prior art, it is inevitable that parasitic inductance exists in wires in a circuit board or in components. The existing parasitic parameters more or less generate current oscillations under the action of sudden current changes. Even if the current oscillation is very small, it will still be exposed to the above-mentioned usage scenario.

Figure 1:
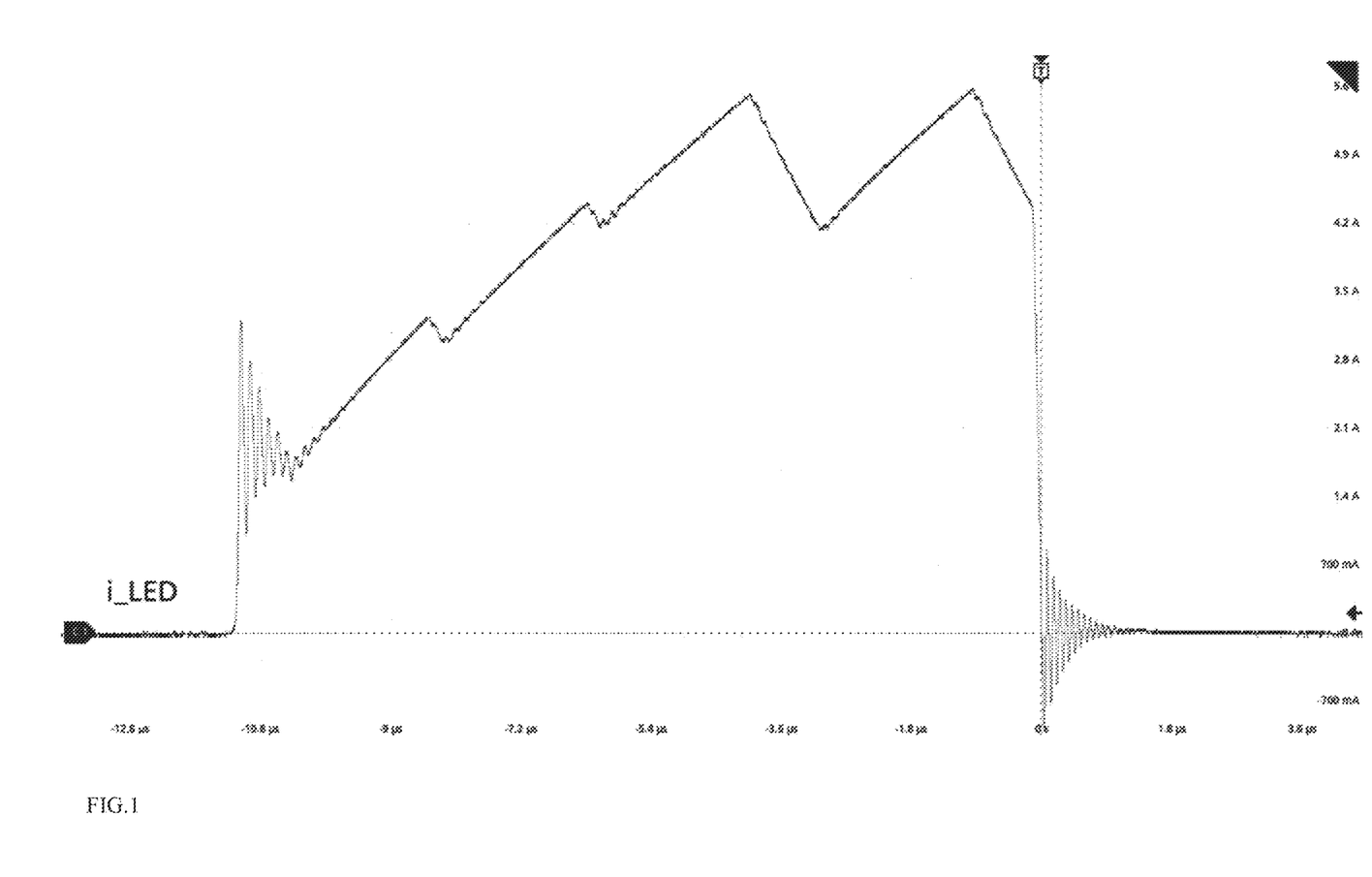
FIG. 1 is a waveform diagram of current oscillation and current ripple in the prior art.

As shown in FIG. 1, current oscillation occurs when a circuit switch is closed or opened (such as sudden current change). Such oscillation makes the current uncontrolled and change non-linearly, affecting the brightness adjusting effect in low brightness (dark part). At the same time, the current magnitude changes unsteadily during current rising, resulting in sawtooth current, which is referred to current ripples.

Trial-and-error method is usually used to suppress circuit oscillations in the prior art. The specific operation thereof is to continuously tip to weld multiple components with different parameters into the circuit, and continuously test the current waveform until the current oscillation decreases or is recovered. However, this manual trial-and-error operation is time-consuming, laborious and ineffective. At the same time, the current ripple of the circuit can only be adjusted to be smaller, but it cannot be completely eliminated. However, even if the current ripple is adjusted to be very small, it also will be exposed to brightness adjusting in low brightness.

SUMMARY OF THE INVENTION

In view of the above-mentioned deficiencies, the present invention provides a device for reducing jitter of light source in low brightness by a vibration suppression module and a light fixture with therefore, which can steadily brighten the LED light source, avoiding the problem of light flicker or jitter.

According to one aspect of the present invention, a device for reducing jitter of light source in low brightness by a vibration suppression module is provided, which includes an LED light source, an inductor L, a current control module, a switch K1, a signal control module, a current acquisition module, and the vibration suppression module.

A first end of the switch K1 is used for inputting a voltage $V_{in}$, and a second end of the switch K1 is connected to a first end of the inductor L.

A second end of the inductor L is connected to an anode of the LED light source, and a cathode of the LED light source is grounded.

A first end of the current control module is connected to the second end of the switch K1 and the first end of the inductor L, and a second end of the current control module is grounded. When the switch K1 is closed, the current control module is cut off, and when the switch K1 is opened, the current control module is conducted.

The current acquisition module according to the present invention is used for detecting a current flowing through the inductor L when the inductor L is charged, and is connected to the signal control module, and sends a current signal to the signal control module according to the detected current.

The signal control module is further connected to the switch K1 and used for controlling the switch K1 to be opened or closed according to the received current signal or a preset time threshold.

The vibration suppression module is used for suppressing current oscillations generated in the device. A first end of the vibration suppression module is connected to the second end of the inductor L and the anode of the LED light source, a second end of the vibration suppression module is connected to the cathode of the LED light source and ground.

The vibration suppression module includes a vibration suppression resistor R and a vibration suppression capacitor C.

According the present invention, a first end of the vibration suppression resistor R is connected to the second end of the inductor L and the anode of the LED light source, a second end of the vibration suppression resistor R is connected to a first end of the vibration suppression capacitor C, and a second end of the vibration suppression capacitor C is connected to the cathode of the LED light source and the ground.

Alternatively, the first end of the vibration suppression capacitor C is connected to the second end of the inductor L and the anode of the LED light source, the second end of the vibration suppression capacitor C is connected to the first end of the vibration suppression resistor R, and the second end of the vibration suppression resistor R is connected to the cathode of the LED light source and the ground.

The vibration suppression resistor R is:

$$R = \frac{\left(\frac{f_0}{f_1}\right)^2 - 1}{2\pi f_0 C_1}.$$

The vibration suppression capacitor C is:

$$C = \frac{3C_1}{\left(\frac{f_0}{f_1}\right)^2 - 1},$$

wherein, $C_1$ is a known capacitor, $f_0$ is an original oscillation frequency of the current flowing through the LED light source when the vibration suppression module is not set, and $f_1$ is a temporary oscillation frequency of the current flowing through the LED light source after the known capacitor $C_1$ is connected to two ends of the LED light source in parallel when the vibration suppression module is not set.

The temporary oscillation frequency $f_1$ of the current of the LED light source after the known capacitor $C_1$ is connected in parallel is particularly greater than or equal to half of the original oscillation frequency $f_0$.

The current acquisition module presets a current threshold. When the current detected by the current acquisition module reaches the current threshold, the current signal is sent to the signal control module, so that the signal control module controls the switch K1 to be opened.

The signal control module presets a time threshold, and controls the switch K1 to be closed when it is detected that opening time of the switch K1 exceeds the time threshold.

A first end of the current acquisition module inputs the voltage $V_{in}$, and a second end of the current acquisition module is connected to the first end of the switch K1.

Alternatively, the first end of the current acquisition module is connected to the second end of the switch K1, and the second end of the current acquisition module is connected to the first end of the current control module and the first end of the inductor L.

Alternatively, the first end of the current acquisition module is connected to the second end of the inductor L, and the second end of the current acquisition module is connected to the anode of the LED light source and the first end of the vibration suppression module.

The current control module is a diode D1, a cathode of the diode D1 is connected to the first end of the inductor L, and the second end of the switch K1, and an anode of the diode D1 is grounded.

The current control module is a switch K2, a first end of the switch K2 is connected to the first end of the inductor L and the second end of the switch K1, a second end of the switch K2 is grounded. When the switch K1 is closed, the switch K2 is opened, and when the switch K1 is opened, the switch K2 is closed.

The switch K2 is also connected to the signal control module, so that the signal control module controls the switch K2 to be closed or opened.

According to the second aspect of the present invention, a light fixture is provided, which includes at least one device mentioned above.

Compared with the prior art, the present invention obtains sonie beneficial effects.

The device for reducing the jitter of the light source in low brightness by the vibration suppression module to reduce the and the light fixture using the device can eliminate current ripple in a rising process of the current in the LED light source, as well as suppressing the current oscillation generated when the current changes suddenly, the current on the LED light source thus can rise steadily, the LED light source can be steadily brightened, and a phenomenon of light flicker and jitter caused by the current oscillation and the current ripple is also avoided.

1 current control module, 2 signal control module, 3 current acquisition module, 4 signal sending module, and 5 vibration suppression module.

DETAILED DESCRIPTION

The accompanying drawings are only for illustrative descriptions and cannot be understood as a limitation to the present invention. In order to better illustrate the following examples, some parts of the accompanying drawings may be omitted, enlarged or reduced, and do not represent a size of an actual product; and it is understandable for those skilled in the art that some well-known structures in the accompanying drawings and their descriptions may be omitted.

Embodiment 1

Figure 2:
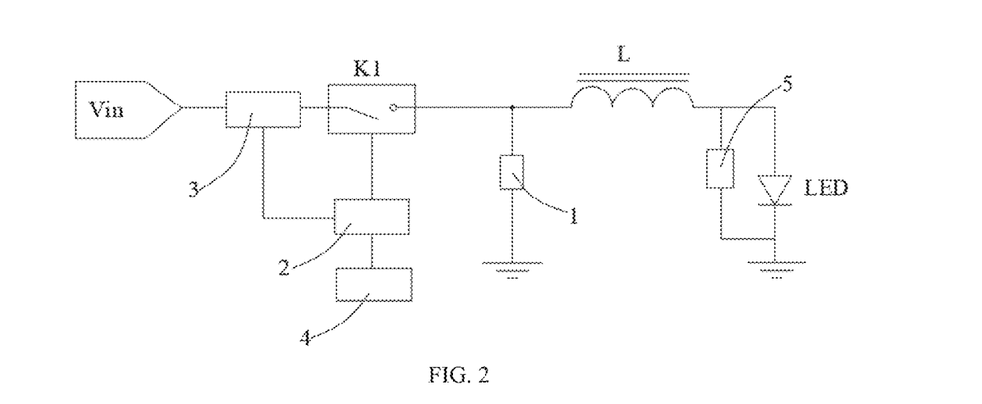
FIG. 2 is a first structural diagram of a device according to an embodiment of the present invention.

As shown in FIG. 2, this embodiment provides a device utilizing a vibration suppression module to reduce jitter of a light source in low brightness, which includes an LED light source, an inductor L, a current control module 1, a switch K1, a signal control module 2, a current acquisition module 3, and the vibration suppression module 5.

A first end of the switch K1 is used for inputting a voltage $V_{in}$, and a second end of the switch K1 is connected to a first end of the inductor L.

A second end of the inductor L is connected to an anode of the LED light source, and a cathode of the LED light source is grounded.

A first end of the current control module 1 is connected to the second end of the switch K1 and the first end of the inductor L, and a second end of the current control module 1 is grounded. When the switch K1 is closed, the current control module 1 is cut off, and when the switch K1 is open, the current control module 1 is conducted.

The current acquisition module 3 is used for detecting a current flowing through the inductor L when the inductor L is charged, being connected to the signal control module 2, and sending a current signal to the signal control module 2 according to the detected current.

The signal control module 2 is further connected to the switch K1 and used for controlling the switch K1 to be opened or closed according to the received current signal or a preset time threshold.

The vibration suppression module 5 is used for suppressing current oscillations generated in the device. A first end of the vibration suppression module 5 is connected to the second end of the inductor L and the anode of the LED light source, and a second end of the vibration suppression module 5 is connected to the cathode of the LED light source and ground.

According to the device of the present embodiment, charging and discharging of the inductor L is controlled by controlling the switch K1 to be closed and opened. Even when the switch K1 is opened, due to characteristics of the inductor L, it is still possible to supply a current to the LED light source so that the LED light source continues to emit light.

The current acquisition module 3 detects the current in the device when the inductor is charged, and sends the current signal to the signal control module 2 according to the detected current, so that the signal control module 2 controls whether the switch K1 is opened according to the received current signal. Particularly, the signal control module 2 controls the switch K1 to be closed according to the preset time threshold.

After the switch K1 is closed, the current in the device gradually increases, the inductor L is charged, the current on the LED light source gradually rises, and the current on the LEI) light source will keep steadily rising until the current acquired by the current acquisition module 3 reaches the current threshold. When the current acquired by the current acquisition module 3 reaches the current threshold, the current acquisition module 3 sends the current signal to the signal control module 2, so that the signal control module 2 controls the switch K1 to be opened, the inductor L is then discharged, and the current continues to flow to the LED light source, but the current changes in magnitude. After the preset time threshold, the signal control module 2 controls the switch K1 to be closed again.

It can be understood that the current acquisition module 3 detects the current in the device when the inductor L, is charged, which includes, but is not limited to that the current acquisition module 3 detects the current in the device only when the inductor L is chamed, or the current acquisition module 3 detects the current in the device when the inductor L is both charged and discharged.

According to the present invention, the current on the LED light source can smoothly rise before the current acquired by the current acquisition module 3 reaches the current threshold value, without any current ripples.

In addition, the vibration suppression module 5 connected in parallel to two ends of the LED light source can effectively suppress the current oscillation generated when the device has a sudden current change, so that when the switch K1 is closed or opened, the current oscillation will not be generated, avoiding light flicker or jitter of the LED light source light fixture caused by the current oscillation when adjusting brightness in low brightness.

Thus, the device of the present embodiment can effectively suppress the current oscillation when the current change suddenly and avoids the phenomenon of light flicker or jitter of the LED light source when low brightness gradually starts to become brightened.

According to the embodiment, the vibration suppression module 5 includes a vibration suppression resistor R and a vibration suppression capacitor C.

Figure 3:
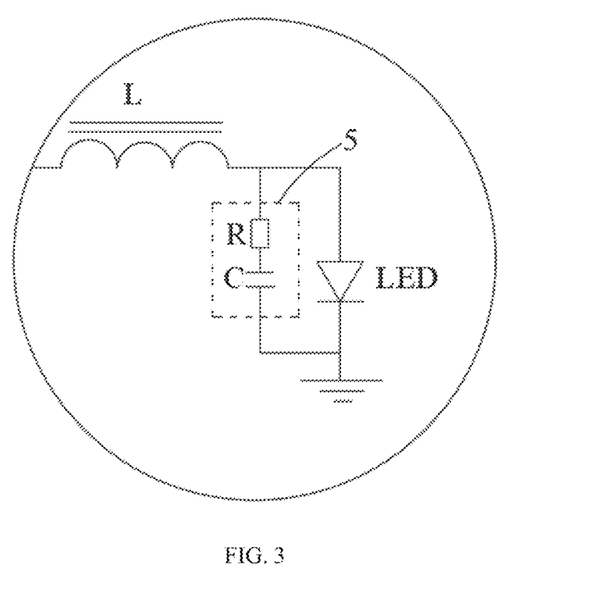
FIG. 3 is a first structural diagram of a vibration suppression module in Embodiment 1 of the present invention.

A first end of the vibration suppression resistor R is connected to the second end of the inductor L and the anode of the LED light source, a second end of the vibration suppression resistor R is connected to a first end of the vibration suppression capacitor C, and a second end of the vibration suppression capacitor C is connected to the cathode of the LED light source and the ground.

Figure 4:
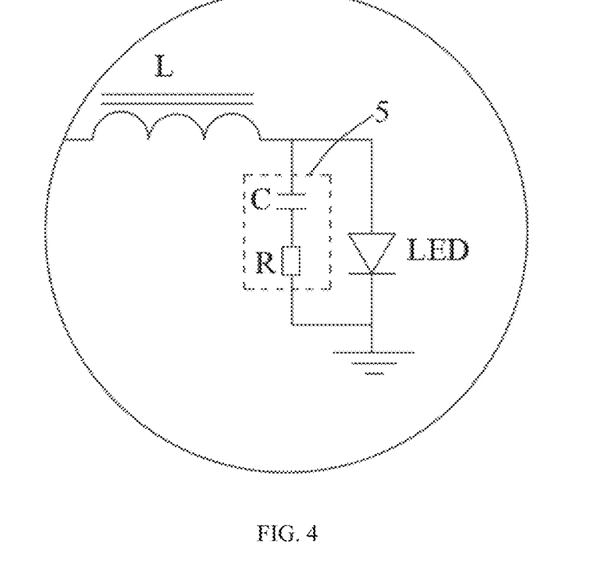
FIG. 4 is a second structural diagram of the vibration suppression module of Embodiment 1 of the present invention.

Alternatively, the first end of the vibration suppression capacitor C is connected to the second end of the inductor L and the anode of the LED light source, the second end of the vibration suppression capacitor C is connected to the first end of the vibration suppression resistor R, and the second end of the vibration suppression resistor R is connected to the cathode of the LED light source and the ground.

The vibration suppression resistor R and the vibration suppression capacitor C of the vibration suppression module 5 are connected in series with each other and then connected in parallel to the two ends of the LED light source. In the present embodiment, preferably, as shown in FIG. 3, the first end of the vibration suppression resistor R is the first end of the vibration suppression module 5, and the second end of the vibration suppression capacitor C is the second end of the vibration suppression module 5, or as shown in FIG. 4, the first end of the vibration suppression capacitor C is the first end of the vibration suppression module 5, and the second end of the vibration suppression resistor R is the second end of the vibration suppression module 5.

The vibration suppression module 5 can effectively eliminate the current oscillation generated when the current changes suddenly, so that the LED light source can be brightened smoothly, avoiding the problem of light flicker and jitter caused by the current oscillation.

The vibration suppression resistor R is:

$$R = \frac{\left(\frac{f_0}{f_1}\right)^2 - 1}{2\pi f_0 C_1};$$

and
The vibration suppression capacitor C is:

$$C = \frac{3C_1}{\left(\frac{f_0}{f_1}\right)^2 - 1};$$

wherein, $C_1$ is a known capacitor, $f_0$ is an original oscillation frequency of the current flowing through the LED light source when the vibration suppression module 5 is not set, and $f_1$ is a temporary oscillation frequency of the current flowing through the LED light source after the known capacitor $C_1$ is connected to the two ends of the LED light source in parallel when the vibration suppression module 5 is not set.

It can be understood that the values of the vibration suppression resistor R and the vibration suppression capacitor C can slightly Change, which are required that after the vibration suppression module 5 is set, when the LED light source is brightened, the human eye cannot easily perceive the brightness flicker of the LED light source.

A method for acquiring the original oscillation frequency $f_0$ of the LED light source, the temporary oscillation frequency $f_1$ of the LED light source and the known capacitor $C_1$ specifically includes the steps of:

S1: when the vibration suppression module is not set, measuring the original oscillation frequency $f_0$ of the LED light source;

S2: when the vibration suppression module is not set, connecting the known capacitor $C_1$ in parallel at the two ends of the LED light source, and measuring the temporary oscillation frequency $f_1$.

Preferably, the original oscillation frequency $f_0$ and the temporary oscillation frequency $f_1$ can be measured by using common equipment such as an oscilloscope, which is low in cost and simple in testing operation.

According to the original oscillation frequency $f_0$ and the temporary oscillation frequency $f_1$, a frequency shift ratio a can be obtained by calculation:

$$a = f_0/f_1.$$

A parasitic capacitor $C_0$ of the device is:

$$C_0 = \frac{C_1}{a^2 - 1}.$$

A parasitic inductor $L_0$ of the device is:

$$L_0 = \frac{a^2 - 1}{(2\pi f_0)^2 C_1};$$

The vibration suppression resistor R is:

$$R = \sqrt{\frac{L_0}{C_0}};$$

According to a relational expression between the parasitic capacitor $C_0$ and the parasitic inductor $L_0$, the vibration suppression resistor R is obtained as:

$$R = \frac{\left(\frac{f_0}{f_1}\right)^2 - 1}{2\pi f_0 C_1};$$

The vibration suppression capacitor C is: $C = 3C_0$.

According to a relational expression between the parasitic capacitor $C_0$ and the frequency shift ratio a, it is obtained:

$$C = \frac{3C_1}{\left(\frac{f_0}{f_1}\right)^2 - 1}.$$

The temporary oscillation frequency $f_1$ of the current of the LED light source after the known capacitor $C_1$ is connected in parallel is particularly greater than or equal to half of the original oscillation frequency $f_0$.

It should be noted that the selected known capacitor $C_1$ is required to keep the frequency shift ratio $a \leq 2$, that is, $f_1 \geq 0.5 * f_0$, which makes the temporary oscillation frequency $f_1$ more accurate measured after the LED light source is connected in parallel with the known capacitor $C_1$.

As one example of this embodiment, in a certain application scenario, the original oscillation frequency $f_0 = 3.4$ MHz of the LED light source is measured at a certain time, the selected known capacitance $C_1$ is equal to 470 pF, and the temporary oscillation frequency f1=2.42 MHz is measured again after the LED light source is connected in parallel with the known capacitor $C_1$, at this moment, it is obvious that $f_1 \geq 0.5 * f_0$.

It is calculated that a magnitude of the vibration suppression resistor R is:

$$R = \frac{\left(\frac{f_0}{f_1}\right)^2 - 1}{2\pi f_0 C_1}$$

$$= \frac{\left(\frac{3.46}{2.42}\right)^2 - 1}{2 \times 3.14 \times (3.46 \times 10^6) \times (470 \times 10^{-12})}$$

$$= 102(\Omega)$$

The vibration suppression capacitor C is:

$$C = \frac{3C_1}{\left(\frac{f_0}{f_1}\right)^2 - 1}$$

$$= \frac{3 \times 470}{\left(\frac{3.46}{2.42}\right)^2 - 1}$$

$$= 1350(pF)$$

Therefore, the vibration suppression resistor R with a resistance value of 102Ω and the vibration suppression capacitor C with a capacity value of 1350 pF can be connected in series and connected in parallel at the two ends of the LED light source for suppressing the current oscillation generated when the current changes suddenly.

The current acquisition module 3 presets the current threshold. When the current detected by the current acquisition module 3 reaches the current threshold, an opening current signal is sent to the signal control module 2, so that the signal control module 2 controls the switch K1 to be opened.

The signal control module 2 presets the time threshold, and controls the switch K1 to be closed when it is detected that opening time of the switch K1 exceeds the time threshold.

Based on the preset current threshold and time threshold, the work principle of the device of this example is described in detail as follows.

The device inputs the voltage $V_{in}$ and starts to work. Firstly, the signal control module 2 outputs a closing signal to the switch K1 to close the switch K1, the inductor L is charged, and the current control module 1 cuts off A current closing loop includes the switch K1, the inductor L and the LED light source, in which the current flows to the LED light source, and the current on the LED light source starts to rise. When the current in the device acquired by the current acquisition module 3 reaches the preset current threshold, the current acquisition module 3 sends the current signal to the signal control module 2, and the signal control module 2 outputs an opening signal to the switch K1 so as to open the switch K1. At this moment, the inductor L is discharged, the current control module 1 conducts, and the current closing loop includes the inductor L, the LED light source and the current control module 1, the current still flows to the LED light source, but the magnitude of the current will decrease. When the inductor L is discharged for the preset time threshold, the signal control module 2 will control the switch K1 to be closed again. Under the action of the input voltage $V_{in}$, the inductor L is charged again, and the magnitude of the current rises relative to that when the inductor L is discharged. When the current reaches the current threshold again, under the action of the current acquisition module 3 and the signal control module 2, the switch K1 is controlled to be opened, and the inductor L is discharged, operation repeats in this way, and the inductor L is repeatedly charged and discharged, so as to provide a continuous current for the LED light source.

It can be understood that the current ripple is generated due to the change in the magnitude of the current when the inductor L is repeatedly charged and discharged. However, by setting the process of discharging the inductor L after the current starts to rise from 0 to the current threshold, the current ripple in the process that the current starts to rise until it reaches the current threshold can be eliminated, and the LED light source can be gradually brightened under a steady rising current, With such configuration, when the LED light source adjusts brightness in the dark part region, the current can steadily rise from 0, so that the brightness of the LED light source can be steadily increased without flicker or jitter.

According to an embodiment, the device further includes a signal sending module 4 which is connected to the signal control module 2, and is used for sending a control signal to the signal control module 2. The signal control module 2 thus determines whether to control the switch K1 according to the control signal.

In the present embodiment, preferably, the control signal sent by the signal sending module 4 may be a PWM signal. The signal control module 2 determines whether to control the switch K1 according to the PWM signal sent by the signal sending module 4. When the PWM signal is at a high level, the signal control module 2 works normally, and can control the switch K1 to be closed or opened according to the current signal sent by the current acquisition module 3, at this moment, the device works normally, the current on the LED light source is not 0, and the LED light source can emit light. When the PWM signal is at a low level, the signal control module 2 does not work, and then cannot control the switch K1 to be closed or opened according to the current signal sent by the current acquisition module 3, at this moment, the device stops working, and the current on the LED light source is 0, and the LED light source cannot emit light. That is, whether the device works normally, and whether the LED light source emits light, can be controlled by the PWM signal sent by the signal sending module 4.

A first end of the current acquisition module 3 inputs the voltage $V_{in}$, and a second end of the current acquisition module 3 is connected to the first end of the switch K1.

Alternatively, the first end of the current acquisition module 3 is connected to the second end of the switch K1, and the second end of the current acquisition module 3 is connected to the first end of the current control module 1 and the first end of the inductor L.

Alternatively, the first end of the current acquisition module 3 is connected to the second end of the inductor L, and the second end of the current acquisition module 3 is connected to the anode of the LEI) light source.

A position of the current acquisition module depends on whether the current can be detected when the inductor L is charged.

Figure 5:
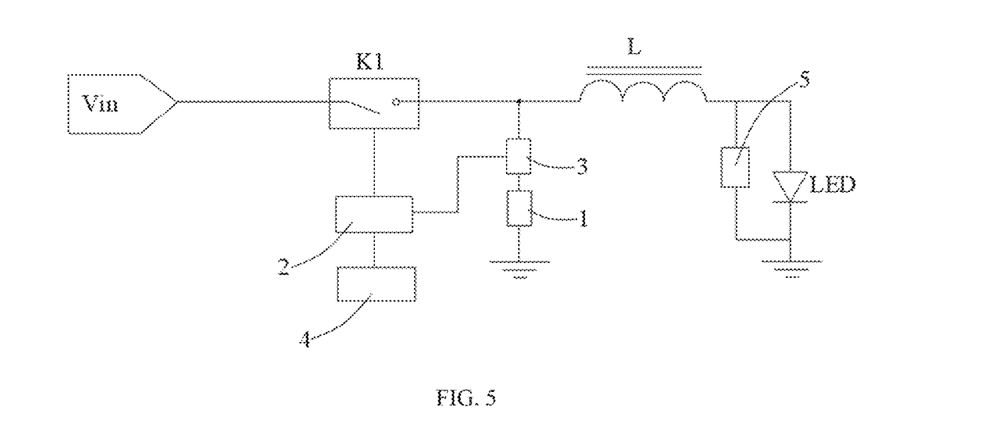
FIG. 5 is a second structural diagram of the device according to an embodiment of the present invention.

As shown in FIG. 5, if the current acquisition module 3 is arranged on a branch circuit of the current control module 1, the current acquisition module 3 is on the current closing loop when the inductor L is discharged, which is not on the current closing loop when the inductor L, is charged, the current acquisition module 3 thus can only acquire a loop current when the inductor L is discharged. Therefore, in the process of adjusting brightness of the LED light source in the dark part, the inductor L needs to have at least one discharging process, so that the current acquisition module 3 can detect the current, and based on the detected current, the signal control module 2 can be controlled to control the switch K1 to be closed or opened so as to enable the LED light source to work normally. That is, the inductor L needs to be charged and discharged repeatedly while the LED light source is adjusted to be brightened from the dark part region. However, during charging-discharging conversion of the inductor L, although the current shows a rising trend as a whole, the current will rise and fall in a small range, as shown in FIG. 1, at this moment, current sawtooth occurs on the LED light source in the rising process. That is to say, when the LED light source is adjusted to be brightened in the dark part, the current ripple occurs in the rising process of the current.

Figure 6:
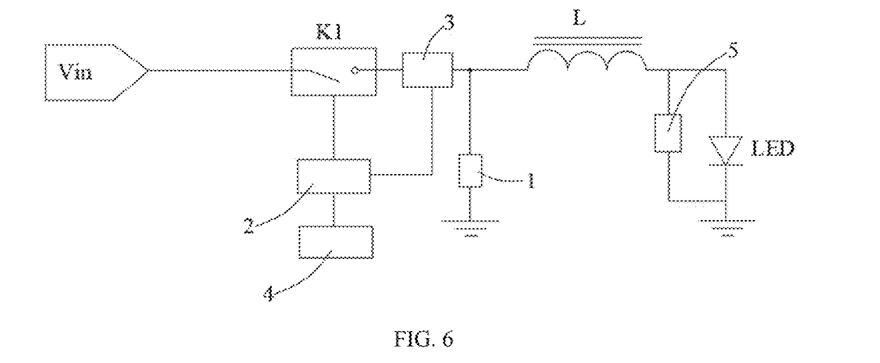
FIG. 6 is a third structural diagram of the device according to an embodiment of the present invention.
Figure 7:
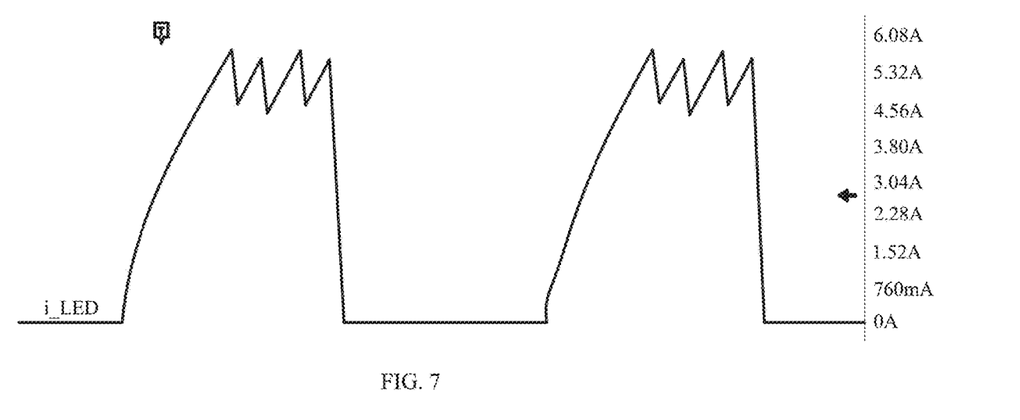
FIG. 7 is a relational graph of current i_LED changes over time of Embodiment 1 of the present invention.

According to the present embodiment, preferably, as shown in FIG. 2 and FIG. 6, the current acquisition module 3 may be directly connected to the switch K1, and specifically, may be provided at a front end or a rear end of the switch K1. That is to say, the current acquisition module 3 is located in the current closing loop in which the inductor L is charged, but not in the current closing loop in which the inductor L is discharged, the current acquisition module 3 thus only detects the loop current when the inductor L is charged. The current threshold of the current acquisition module 3 can be preset as a steady current value of the LED light source after dark part brightness adjusting is completed. After the switch K1 is closed, the inductor L is charged, and the current acquisition module 3 detects that the current in the loop steadily rises to the preset current threshold. Namely when the current reaches the steady current value of the LED light source after adjusting brightness of the dark part, the current acquisition module 3 sends the current signal to the signal control module 2. In the process that the current rises to the current threshold, the current on the LED light source rises steadily due to the absence of the discharging process of the inductor L. Therefore, as shown in FIG. 7. no current sawtooth occurs on the LED light source during rising, no current ripple thus occurs, either.

After receiving the current signal, the signal control module 2 outputs the opening signal to the switch K1 to open the switch K1 the inductor L is then discharged, the current control module 1 conducts, and the current closing loop comprises the current control module 1, the inductor L and the LED light source, and the current continues to flow to the LED light source. The signal control module 2 continues to control the switch K1 to be closed or opened, the inductor L is charged and discharged repeatedly, and the current on the LED light source rises and falls within a small range of the current threshold, Therefore, as shown in FIG. 7, the current i_LED fluctuates within a certain current range after stable rising, resulting in current ripple.

However, at the same time, the vibration suppression module 5 can eliminate the current oscillation when the current changes suddenly, so that the current oscillation as shown in FIG. 1 does not occur in the process that the current rises from 0.

In combination with the vibration suppression module 5, the device of the present embodiment can avoid the problem of light flicker and jitter of the LED light source when adjusting brightness in the dark part due to the current ripple and the current oscillation.

Preferably, the stable current value of the LED light source after the dark part brightness adjusting is completed may be a peak current when the current steadily rises to a first peak point, or may be a certain current value within a fluctuation range after stable rising of the current is completed.

Preferably, the preset current threshold may be between 4A and 6A.

Figure 8:
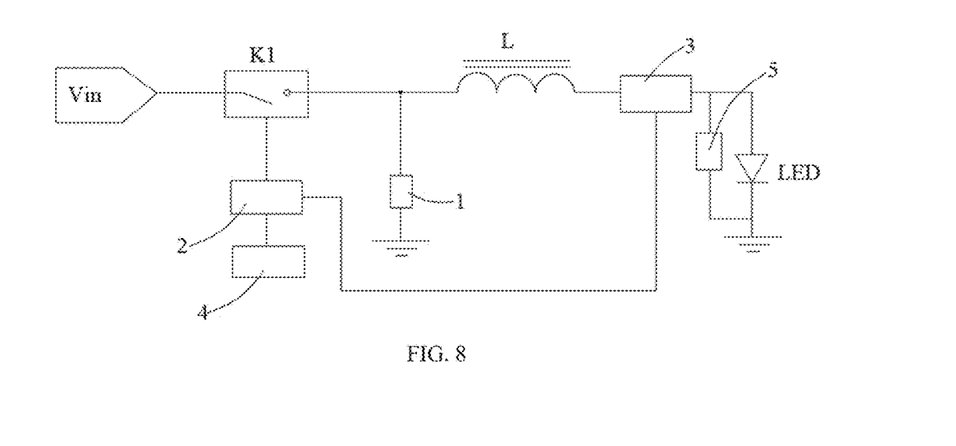
FIG. 8 is a fourth structural diagram of the device according to an embodiment of the present invention.

Preferably, as shown in FIG. 8, the current acquisition module 3 may also be arranged at the rear end of the inductor L, specifically, the current acquisition module 3 is arranged between the first end of the inductor L and the anode of the LED light source. In such configuration, the current acquisition module 3 can detect the current in the charging and discharging process of the inductor L. After receiving the current signal, the signal control module 2 outputs the opening signal to the switch K1 so as to open the switch K1, the inductor L discharges, the current control module 1 conducts, and the current closing loop includes the current control module 1, the inductor L and the LED light source, and the current continues to flow to the LED light source. The signal control module 2 continues to control the switch K1 to be closed or opened, the inductor L charges and discharges repeatedly, and the current on the LED light source rises and falls within a small range of the current threshold.

It should be noted that the current acquisition module 3 may be at various positions, which are not listed one by one.

Figure 9:
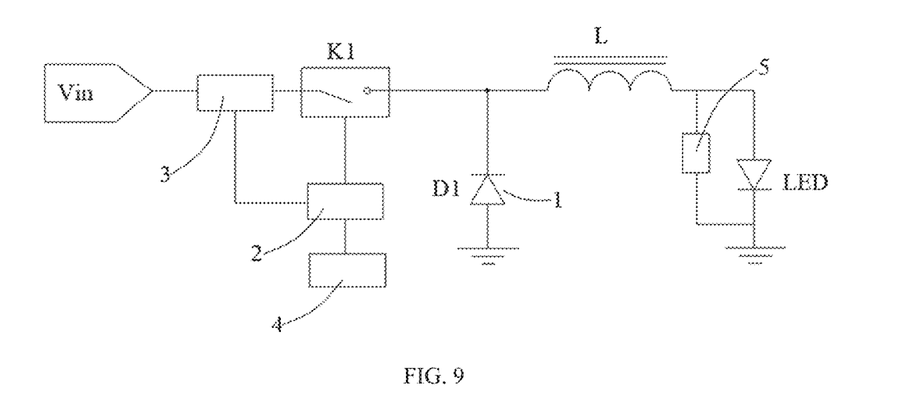
FIG. 9 is a fifth structural diagram of the device according to an embodiment of the present invention.

The current control module 1 may be a diode D1, a cathode of the diode D1 is connected to the first end of the inductor L and the second end of the switch K1, and an anode of the diode D1 is grounded.

As shown in FIG. 9, the diode D1 can be preferably selected as the current control module 1.

It should be noted that the LED light source in this embodiment is a light-emitting diode.

A direction of the diode D1 is opposite to a direction of the light-emitting diode of the LED light source. Specifically, according to the embodiment, the current in the light-emitting diode can only flow in a clockwise direction, and the current in the diode D1 can only flow in a counter-clockwise direction. When the switch K1 is closed and the inductor L is charged, the current direction is opposite to the direction of the diode D1, the current cannot flow into the diode D1, and a current loop includes the switch K1, the inductor L and the LED light source. When the switch K1 is opened and the inductor L is discharged, the current direction is the same as the direction of the diode D1, the current can flow into the diode D1, and the current loop includes the diode D1, the inductor L and the LED light source.

Figure 10:
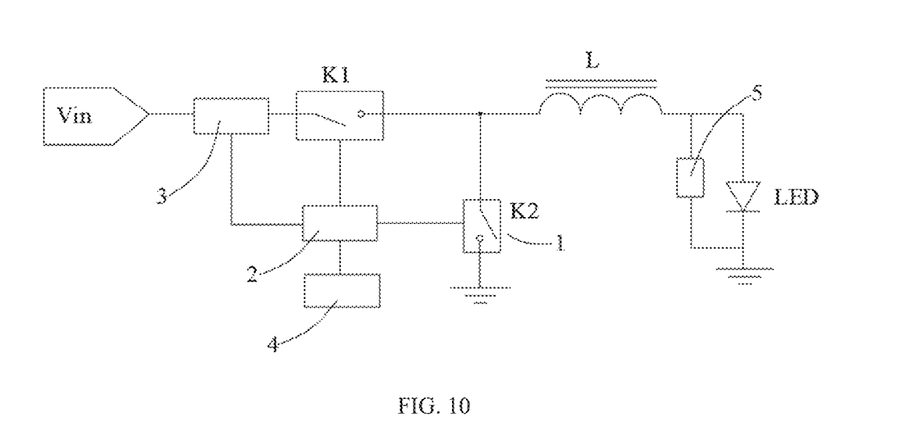
FIG. 10 is a sixth structural diagram of the device according to an embodiment of the present invention.

Preferably, as shown in FIG. 10, the current control module 1 may also be a switch K2. A first end of the switch K2 is connected to the first end of the inductor L and the second end of the switch K1, and a second end of the switch K2 is grounded. When the switch K1 is closed, the switch K2 is opened, and when the switch K1 is opened, the switch K2 is closed.

The switch K2 is switched on and off in opposition to the switch K1. When the switch K1 is closed and the inductor 1, is charged, the switch K2 is opened, the current cannot flow onto a branch circuit of the switch K2, and the current loop includes the switch K1, the inductor L and the LED light source. When the switch K1 is opened and the inductor L is discharged, the switch K2 is closed, the current can flow onto a branch circuit of the switch K2, and the current loop includes the switch K2, the inductor L and the LED light source.

The arrangement of the current control imdule 1 enables the inductor L to form different current loops in the charging and discharging process. It is only required that a current acquisition module is set at a position capable of detecting the loop current when the inductor L is charged, and the current threshold of the current acquisition module 3 is set, the current ripple of the current of the LED light source in the rising process thus can be eliminated.

Preferably, the switch K1 and the switch K2 may be electronic switches. The electronic switch is an operating unit that controls a circuit to be connected or disconnected by an electronic circuit and a power electronic device, and at least includes a controllable electronic device, such as a thyristor, a transistor, a field effect transistor, a silicon-controlled rectifier, a relay, etc.

When the current control module 1 is the switch K2, the switch K2 is further connected to the signal control module 2 so that the signal control module 2 controls the switch K2 to be closed or opened.

In the embodiment, preferably, the switch K2 can likewise be controlled by the signal control module 2, when the signal control module 2 sends the closing signal to the switch K1, it sends the opening signal to the switch K2 at the same time, so that the switch K1 is closed and the switch K2 is opened. Likewise, when the signal control module 2 sends the opening signal to the switch K1, it sends the closing signal to the switch K2 at the same time, so that the switch K1 is opened and the switch K2 is closed.

According to the device of the present embodiment, current ripple or current oscillation does not happen to the current in the LED light source on the device in the process that the current rises from 0, and the current can smoothly rise to the current threshold so that the LED light source can be smoothly brightened without the problems of light flicker and jitter.

Embodiment 2

Based on the device for reducing jitter of light source in low brightness by the vibration suppression module provided in Embodiment 1, the present embodiment provides a method utilizing a vibration suppression module to reduce low-brightness jitter of a light source, which is used for controlling a current changing rate of the LED light source in the device mentioned above. The method includes reducing the current changing rate k of the current flowing through the LED light source to avoid current ripple of the current flowing through the LED light source in a dark part region.

When the switch K1 is closed, the current flows to the LED light source, so that the current on the LED light source gradually rises and the LED light source gradually becomes brightened. However, if the current on the LED light source rises faster, the current on the LED light source has reached a current threshold before the dark part, the switch K1 will be opened, and the current acquisition module 3 will still acquire the current when the inductor L is discharged. At this moment, although no current ripple happens to the current on the LED light source in the rising process, the current ripple still appears after rising is completed, and after current rising is completed, the LED light source is still in a dark part, so that when adjusting brightness in this dark part region, the LED light source still suffers from the problem of light flicker and jitter.

Therefore, it is necessary to reduce a rising speed of the current on the LED light source, namely, to reduce the current changing rate k of the current flowing through the LED light source, which prolongs time for reaching the current threshold, so that the current on the LED light source cannot reach the current threshold before the dark part region, accordingly no current ripple occurs in the dark part region, and the problem of light flicker and jitter of the LED light source is avoided when adjusting brightness in the dark part region.

Figure 11:
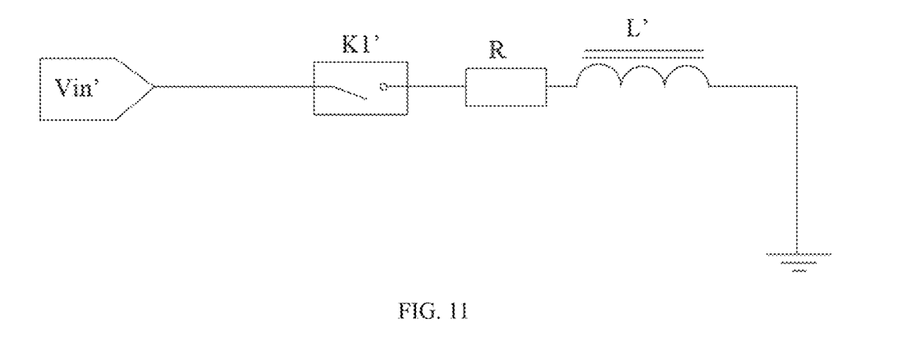
FIG. 11 is a simplified circuit model diagram according to Embodiment 2 of the present invention.

FIG. 11 is a simplified circuit model according to the present embodiment, which includes a switch K1', a load R, and an inductor L' connected in series in sequence. The inductor L' is grounded. One end of the switch K1' inputs a voltage $V_{in}'$. The current changing rate k may be derived based on the simplified current model.

According to LR circuit characteristics, a charging current of the inductor L' is:

$$i(t) = \frac{V_{in}'}{R}\left(1 - e^{-\frac{R}{L'}t}\right);$$

wherein, $V_{in}'$ is a magnitude of the input voltage in the circuit model, R is a magnitude of a resistance in the circuit model, L' is a magnitude of an inductance in the circuit model, t is time, and e is an Euler constant.

The above formula is derived on both sides:

$$\frac{di(t)}{dt} = \frac{V_{in}'}{R}\left(\frac{R}{L'}e^{-\frac{R}{L'}t}\right).$$

when the resistance R tends to be 0, simplifying:

$$\frac{di(t)}{dt}\bigg|_{R \to 0} = \frac{V_{in}'}{L'}.$$

In the above derivation, since the resistance R tends to be 0, $V_{in}'$ is equivalent to a voltage $V_L'$ on the inductor L', that is, $V_{in}'=V_L'$.

It is obtained that:

$$\frac{di(t)}{dt}\bigg|_{R \to 0} = \frac{V_L'}{L'}.$$

In the device of this embodiment, specifically, $V_{in}'=V_{in}$, $V_L'$, L'=1, the LED light source can be regarded as the load R, and the resistance of the LED light source is very small, and can also be considered as tending to be zero, then there is:

$$k = \frac{V_L'}{L'} = \frac{V_L}{l}.$$

The LED light source may cause a change in voltage, and it can be understood that $V_L=V_{in}-V_{out}$, wherein, $V_L$ is the voltage on the inductor L on the device of this example, $V_{in}$ is the input voltage of the device of this example, $V_{out}$ is a voltage at two ends of the LED light source of the device of this example, and then the current changing rate k of the current flowing through the LED light source is:

$$k = \frac{V_{in} - V_{out}}{l};$$

wherein, $V_{in}$ is the input voltage of the device, $V_{out}$ is the voltage at the two ends of the LED light source, and l is a value of a magnitude of the inductor L.

It follows that, in the device of this embodiment, a magnitude of the current changing rate k of the current flowing through the LED light source depends on the input voltage $V_{in}$ of the device of this example and the inductor L of the device of this example and the voltage on the LED light source. The current changing rate k may be reduced by reducinu the input voltage $V_{in}$ and/or increasing the inductor L and/or increasing the voltage at the two ends of the LED light source, so that the current flowing through the LED light source does not generate current ripples in the dark part reaion.

When the inductor L and the LED light source in the device of this example are fixed, it is possible to reduce the current changing rate k by reducing the input voltage $V_{in}$ to make it close to the voltage of the LED light source, so that the current flowing through the LED light source does not generate the current ripple in the dark part region.

Figure 12:
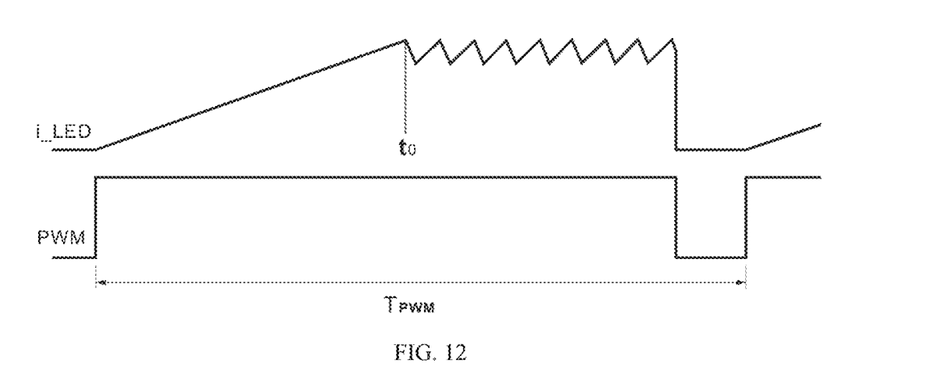
FIG. 12 is a corresponding graph of a current waveform of an LED light source and a PWM signal waveform of Embodiment 2 of the present invention.

FIG. 12 is a corresponding diagram of a current waveform of the LED light source and a PWM signal waveform, wherein $t_0$ is the time when the current of the LED light source continues to rise to a first peak point, its corresponding current value can be preset as the current threshold preset in the current acquisition module 3, and $T_{PWM}$ is a PWM period of the PWM signal used for controlling the device of this example. It can be seen that, in one PWM period, when the PWM signal is at a high level, current i_LED of the LED light source continues to rise at a constant current changing rate k before time $t_0$, and no current sawtooth occurs, namely, no current ripple occurs. However, after $t_0$, the current i_LED of the LED light source starts to have current ripples, so that the current will fluctuate up and down within a stable range. It is possible to increase $t_0$ by decreasing a slope of the current i_LED, and $t_0$ is behind the dark part region of the LED light source, so that when the LED light source adjusts brightness in the dark part region, the current of the LED light source can rise at a constant current changing rate k without significant current ripples until dark part brightness adjusting ends. When the LED light source adjusts brightness in the dark part region, the problem of light flicker and jitter due to current ripples does not occur. When the PWM signal is at a low level, the device of this example stops working and the current i_LED of the LED light source is 0.

Figure 13:
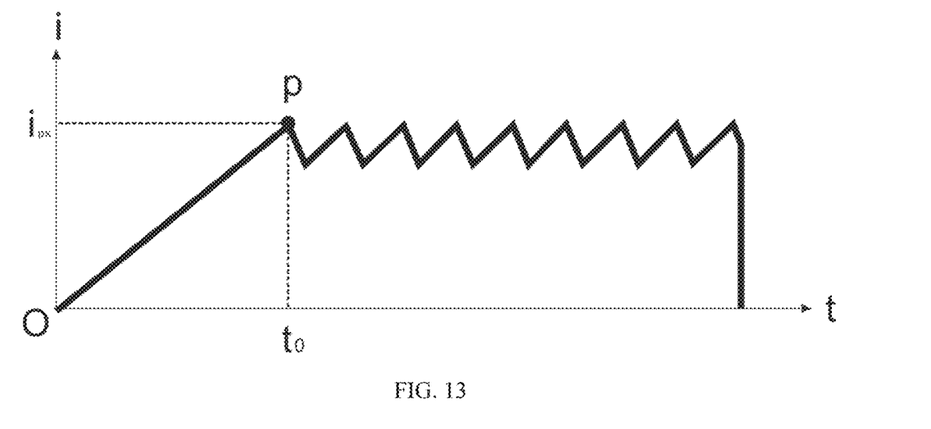
FIG. 13 is a graph showing the relationship of current i_LED and time according to embodiment 2 of the present invention.

As one embodiment of this example, FIG. 13 is a relational graph between the current i_LED on the LED light source and time t after in combination with the vibration suppression module 5. In FIG. 13, $t_0$ is the time when the current of the LED light source continues to rise to the first peak point P, and to takes 30% of the PWM period to ensure that $t_0$ is behind the dark part region, and the period is a reciprocal of the frequency, then there is:

$$t_0 = 0.3 T_{pwm} = \frac{0.3}{f}.$$

The point P is the first current peak point of the current rise of the LED light source, the corresponding peak current $i_{pk}$ is a known number, and the peak current $i_{pk}$ can be set as the current threshold of the current acquisition module 3 of this example.

A slope of a straight line OP is the current changing rate k of the current of the LED light source, and it can be obtained that:

$$k = \frac{i_{pk} - 0}{t_0 - 0} = \frac{i_{pk} \cdot f}{0.3}.$$

Combining a relational expression of the current changing rate k, it can be obtained that:

$$\frac{V_{in} - V_{out}}{l} = \frac{i_{pk} \cdot f}{0.3}.$$

It can be obtained that:

$$l = (V_{in} - V_{out})\frac{i_{pk} \cdot f}{0.3}.$$

In a certain application scenario, a difference between the adjusted input voltage $V_{in}$ and the voltage $V_{out}$ of the LED light source is 5V, the peak current $i_{pk}$ is 5.5 A, and the frequency f of the control signal PWM is 16 kHz. It can be seen from the above formula that the magnitude of the inductor L should be adjusted as:

$$l = (V_{in} - V_{out})\frac{i_{pk} \cdot f}{0.3} = 5 \times \frac{0.3}{5.5 \times 16000} = 17 \ \mu H.$$

By adjusting the magnitude of the inductor L, $t_0$ is 30% of the PWM period, it is ensured that the current can steadily and continuously rise without the current ripple when the LED light source adjusts brightness in the dark part. Further, if it is possible to continue to increase the magnitude of the inductor L appropriately to longer the time to, the percentage of the PWM period is larger, and the time for the current to rise steadily is longer to ensure that the current rises steadily in the dark part region. Preferably, the magnitude of the inductor L can be set to a maximum value when $t_0$ is 40% of the PWM period.

Therefore, the input voltage $V_{in}$ is lowered to be close to the output voltage $V_{out}$, which not only improves the energy conversion efficiency, but also can reduce the current changing rate k of the current on the LED light source during rising, so that the current ripple does not occur when the LED light source adjusts brightness in the dark part region. At the same time, increasing a value of the inductor L can make the output current ripple (a difference between upper and lower points of the current sawtooth) smaller.

Embodiment 3

This embodiment provides a light fixture, which includes one or more devices utilizing the vibration suppression module to reduce the jitter of the light source in low brightness according to Embodiment 1.

Obviously, the above-mentioned examples of the present invention are merely examples to clearly illustrate the technical solution of the present invention, and are not intended to limit the specific embodiment of the present invention. Any modification, equivalent replacement, improvement and the like made within the spirit and principle of the claims of the present invention shall be included in the protection scope of the claims of the present invention.

The invention claimed is:

1. A device for reducing jitter of a light source in low brightness by a vibration suppression module, comprising an LED light source, an inductor L, a current control module, a switch K1, a signal control module, a current acquisition module, and the vibration suppression module, wherein the vibration suppression module comprises a vibration suppression resistor R and a vibration suppression capacitor C;

wherein a first end of the switch K1 is used for inputting a voltage $V_{in}$, and a second end of the switch K1 is connected to a first end of the inductor L;

a second end of the inductor L is connected to an anode of the LED light source, and a cathode of the LED light source is grounded;

a first end of the current control module is connected to the second end of the switch K1 and the first end of the inductor L, and a second end of the current control module is grounded; when the switch K1 is closed, the current control module is cut off, and when the switch K1 is opened, the current control module is conducted;

the current acquisition module is used for detecting a current flowing through the inductor L when the inductor L is charged, is connected to the signal control module, and sends a current signal to the signal control module according to the detected current;

the signal control module is further connected to the switch K1 and used for controlling the switch K1 to be opened or closed according to the received current signal or a preset time threshold; and a first end of the vibration suppression module is connected to the second end of the inductor L and the anode of the LED light source, a second end of the vibration suppression module is connected to the cathode of the LED light source and ground, and the vibration suppression module is used for suppressing current oscillation generated in the device;

wherein a first end of the vibration suppression resistor R is directly connected to the second end of the inductor L and the anode of the LED light source, a second end of the vibration suppression resistor R is connected to a first end of the vibration suppression capacitor C, and a second end of the vibration suppression capacitor C is connected to the cathode of the LED light source and the ground;

wherein the vibration suppression resistor R is:

the vibration suppression capacitor C is:

wherein, $C_1$ is a known capacitor, $f_0$ is an original oscillation frequency of the current flowing through the LED light source when the vibration suppression module is not set, and $f_1$ is a temporary oscillation frequency of the current flowing through the LED light source after the known capacitor $C_1$ is connected to two ends of the LED light source in parallel when the vibration suppression module is not set.

2. A device for reducing jitter of a light source in low brightness by a vibration suppression module, comprising:

an LED light source, an inductor L, a current control module, a switch K1, a signal control module, a current acquisition module, and the vibration suppression module, wherein the vibration suppression module comprises a vibration suppression resistor R and a vibration suppression capacitor C;

wherein a first end of the switch K1 is used for inputting a voltage $V_{in}$, and a second end of the switch K1 is connected to a first end of the inductor L;

a second end of the inductor L is connected to an anode of the LED light source, and a cathode of the LED light source is grounded;

a first end of the current control module is connected to the second end of the switch K1 and the first end of the inductor L, and a second end of the current control module is grounded; when the switch K1 is closed, the current control module is cut off, and when the switch K1 is opened, the current control module is conducted;

the current acquisition module is used for detecting a current flowing through the inductor L when the inductor L is charged, is connected to the signal control module, and sends a current signal to the signal control module according to the detected current;

the signal control module is further connected to the switch K1 and used for controlling the switch K1 to be opened or closed according to the received current signal or a preset time threshold; and a first end of the vibration suppression module is connected to the second end of the inductor L and the anode of the LED light source, a second end of the vibration suppression module is connected to the cathode of the LED light source and ground, and the vibration suppression module is used for suppressing current oscillation generated in the device;

wherein a first end of the vibration suppression capacitor C is connected to the second end of the inductor L and the anode of the LED light source, a second end of the vibration suppression capacitor C is connected to a first end of the vibration suppression resistor R, and a second end of the vibration suppression resistor R is connected to the cathode of the LED light source and the ground;

wherein the vibration suppression resistor R is:

$$R = \frac{\left(\frac{f_0}{f_1}\right)^2 - 1}{2\pi f_0 C_1};$$

the vibration suppression capacitor C is:

$$C = \frac{3C_1}{\left(\frac{f_0}{f_1}\right)^2 - 1};$$

wherein, $C_1$ is a known capacitor, $f_0$ is an original oscillation frequency of the current flowing through the LED light source when the vibration suppression module is not set, and $f_1$ is a temporary oscillation frequency of the current flowing through the LED light source after the known capacitor $C_1$ is connected to two ends of the LED light source in parallel when the vibration suppression module is not set.

3. The device according to claim 1, wherein the temporary oscillation frequency $f_1$ of the current of the LED light source after the known capacitor $C_1$ is connected in parallel is greater than or equal to half of the original oscillation frequency $f_0$.

4. The device according to claim 1, wherein the current acquisition module presets a current threshold, and when the current detected by the current acquisition module reaches the current threshold, the current signal is sent to the signal control module, so that the signal control module controls the switch K1 to be opened, and the signal control module presets a time threshold, and controls the switch K1 to be closed when it is detected that opening time of the switch K1 exceeds the time threshold.

5. The device according to claim 1, wherein a first end of the current acquisition module inputs the voltage $V_{in}$, and a second end of the current acquisition module is connected to the first end of the switch K1.

6. The device according to claim 1, wherein the first end of the current acquisition module is connected to the second end of the switch K1, and the second end of the current acquisition module is connected to the first end of the current control module and the first end of the inductor L.

7. The device according to claim 1, wherein the first end of the current acquisition module is connected to the second end of the inductor L, and the second end of the current acquisition module is connected to the anode of the LED light source and the first end of the vibration suppression module.

8. The device according to claim 1, wherein the current control module is a diode D1, a cathode of the diode D1 is connected to the first end of the inductor L and the second end of the switch K1, and an anode of the diode D1 is grounded.

9. The device according to claim 1, wherein the current control module is a switch K2, a first end of the switch K2 is connected to the first end of the inductor L and the second end of the switch K1, a second end of the switch K2 is grounded, when the switch K1 is closed, the switch K2 is opened, and when the switch K1 is opened, the switch K2 is closed.

10. The device according to claim 9, wherein the switch K2 is connected to the signal control module, so that the signal control module controls the switch K2 to be closed or opened.

11. A light fixture, comprising at least one device for reducing jitter of light source in low brightness by the vibration suppression module according to claim 1.

* * * * *